United States Patent [19]

Draper et al.

[11] Patent Number: 4,495,564

[45] Date of Patent: Jan. 22, 1985

[54] MULTI SUB-CHANNEL ADAPTER WITH SINGLE STATUS/ADDRESS REGISTER

[75] Inventors: Wilburn D. Draper, Raleigh; Melvin T. Laakso, Cary, both of N.C.

[73] Assignee: International Business Machines Corp., Armonk, N.Y.

[21] Appl. No.: 291,741

[22] Filed: Aug. 10, 1981

[51] Int. Cl.³ .............................................. G06F 3/04
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,311,889 | 3/1967 | Birmingham et al. | |
| 3,596,256 | 6/1971 | Alpert et al. | 340/172.5 |
| 3,673,576 | 6/1972 | Donaldson, Jr. | 340/172.5 |
| 3,680,054 | 7/1972 | Bunker et al. | 364/200 |
| 3,725,864 | 4/1973 | Clark et al. | 364/200 |
| 3,833,888 | 9/1974 | Stafford et al. | 340/172.5 |
| 3,902,162 | 8/1975 | Parkinson et al. | 340/172.5 |
| 3,934,232 | 1/1976 | Curley et al. | 340/172.5 |
| 3,997,896 | 12/1976 | Cassarino et al. | 364/200 |
| 4,003,033 | 1/1977 | O'Keefe et al. | 340/172.5 |
| 4,126,897 | 11/1978 | Capowski et al. | 364/200 |
| 4,128,883 | 12/1978 | Duke et al. | 364/200 |
| 4,170,038 | 10/1979 | Bouvier | 364/200 |
| 4,245,300 | 1/1981 | Kaufman et al. | 364/200 |
| 4,246,637 | 1/1981 | Brown et al. | 364/200 |

OTHER PUBLICATIONS

Microsystems, Inc., Micro 812 Communications Processor, Apr. 1970, pp. 1–14.

Steele & Mattson, Computer Design, Architecture of a Universal Communications Processor, Nov. 1973, pp. 63–68.

*Primary Examiner*—Eddie P. Chan

*Attorney, Agent, or Firm*—John B. Frisone

[57] ABSTRACT

An improved adapter for a programmed control unit arranged to be operated in facilitating I/O operations between one or more I/O devices and a CPU through a channel. The improved adapter includes a local store which store has a hardware register dedicated to store device status and the associated address in connection with test I/O commands. Thus, in accordance with the method of the invention on receiving a status request the improved adapter responds immediately with a response indicating that the information is not immediately available, for example, a busy response. The improved adapter initiates an interrupt to the program control unit to obtain the requested status information, which is then stored in dedicated hardware registers of the local store. On the next subsequent test I/O command to the same address, the improved adapter responds with the status as read from the dedicated hardware register. In another aspect the invention provides an improved adapter which includes communication path means, for example hardware registers, passing data to and from the channel and attached devices, and a further hardware register of sufficient capacity to store a status word and an associated address. The adapter also includes a bus for transferring a status word and associated address from the attached control unit in response to a channel received command to the further hardware register and, control circuitry which is responsive to a subsequent status request and command associated with the associated address, for placing the status word from the further hardware register on the channel. The adapter supports both host or control unit initiated I/O status transfers, i.e. both synchronous and asynchronous.

10 Claims, 5 Drawing Figures

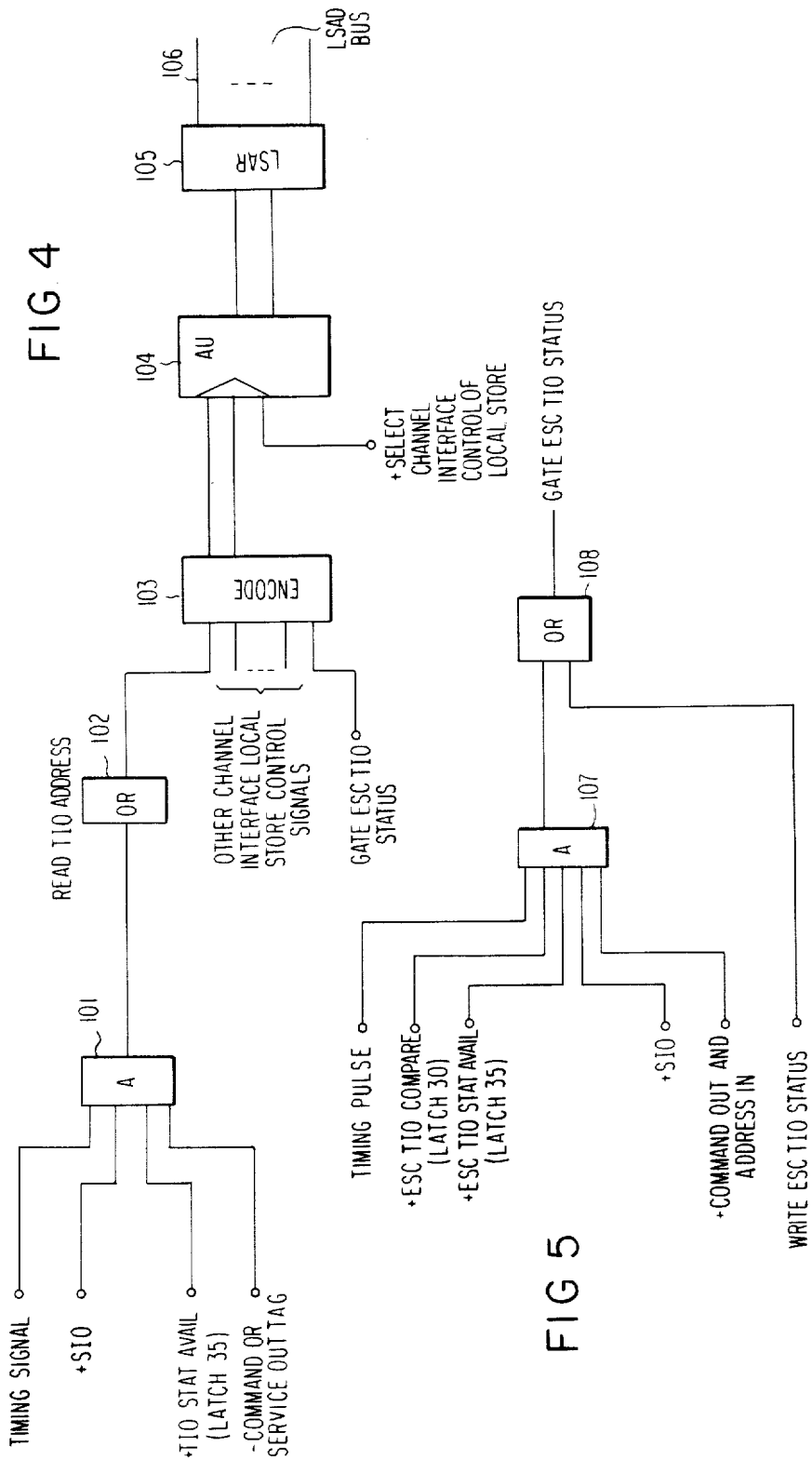

MULTI SUB-CHANNEL ADAPTER WITH SINGLE STATUS/ADDRESS REGISTER

FIELD OF THE INVENTION

The present invention relates to input/output operations respecting digital computers, more particularly those operations which employ a channel, and even more specifically, those operations which employ a multi sub-channel adapter in cooperation with a programmed I/O control unit.

BACKGROUND OF THE INVENTION

As the complexity of computer systems has grown, the manner in which input/output operations are handled has become more complex, particularly as a result of a desire to increase the I/O throughput, without necessarily providing for corresponding increase in equipment complexity. A typical prior art arrangement provides a hardware channel which is adapted to be coupled directly to a Central Processing Unit, and also coupled to input/output (hereinafter I/O) controllers. In order to ensure effective and efficient use of equipment, a mechanism has long been needed for providing information to this Central Processing Unit (hereafter CPU) respecting the condition of selected I/O devices to enable the CPU to operate the I/O devices effectively. Initially, the channel mechanism was employed with control units of the type referred to as comprising only, or essentially only, hardware logic. A particular advantage of this type of control unit is that it is relatively fast in operation, a corresponding disadvantage is that control units for different I/O devices are different, thus necessitating the provision of different control units, and furthermore, the relatively generous use of hardware in these control units meant that this hardware was essentially unused when the associated I/O device was not in operation. Aside from these negative factors the hardware control units operated quite effectively. For example, typically each control unit included a status register to reflect the status of each attached I/O device, and thus if a single control unit was attached to plural I/O devices, then plural status registers were provided in the control unit. Interrogating the status of any particular I/O device, then merely required reading the contents of the associated status register which was accomplished relatively quickly. A subtle problem with this type of hardware control unit was the necessity for providing some type of interlock so that a channel did not attempt to read the status of a register while at the same time the condition of the register was being altered. Nevertheless, the hardware control unit did not detract from effective channel use because of speed limitations.

In an effort, however, to reduce the necessity for different control units for each different type of I/O device and at the same time to reduce overall hardware content, the prior art provided programmed control units. The programmed control unit approach is attractive from a number of view points. Since the same programmed control unit can be personalized in different fashions, by different program routines, the advent of the programmed control unit reduced the necessity for different control units for different types of I/O devices. At the same time, the programmed control unit could reduce total hardware complexity in that the personalization afforded by software (or firmware) allowed a specific piece of hardware (for example, a register) to carry out different functions at different times, under control of different portions of the program, for example. These advantages, however, were not obtained without paying a price, and the price paid for obtaining these advantages was a degredation of channel efficiency. The programmed control unit took significantly longer to respond to channel commands, than did the hardware control unit. The reduction in total hardware reduced the parallelism in the I/O operations and this also contributed to the reduction in speed and hence channel efficiency.

One particular problem which the prior art had not successfully dealt with related to the handling of "test I/O commands". This command is a status request for a particular I/O device which is identified by an address associated with the command. It may be generated by the CPU or it may be a channel generated command. In the essentially hardware control units, this command was readily responded to since it merely required reading the hardware register identified by the address associated with the command. Some programmed control units in the prior art did not support response to this command; those programmed control units would merely respond with a busy indication and take no further action. Of course, in those cases, the test I/O command would never be appropriately responded to.

In an effort to provide some response to this type of command, other forms of programmed control units were arranged to provide some limited support for this type of command. This latter type of prior art programmed control unit would initially respond to the test I/O command with a busy indication, but after one or more of the identical commands, the programmed control unit would make an attempt to locate the requested status, and if the channel did not present any other commands to the particular programmed control unit, interspersed with the test I/O command, the programmed control unit would eventually respond. That is, more particularly after one or more identical test I/O commands, the programmed control unit would locate the requested status and copy it into a selected register. Upon the next subsequent identical command the contents of that register would be presented to the channel. However, since the prior art programmed control units had limited hardware capability, the presence of this information in the selected register prevented a programmed control unit from carrying out any other tasks with respect to the channel. Without some mechanism for clearing this condition the entire system could be locked up, if the register contains status information which is not cleared because no further test I/O command is received. When this particular deficiency was recognized, an attempt was made to overcome the problem by providing a timeout in the programmed control unit, which would clear the selected register of the status information if the identical test I/O command was not received within the timeout period.

For example, one particular prior art programmed control unit, the IBM 3705 type I/IV channel adapter first required three test I/O commands before a test I/O sequence was initiated, then when the test I/O sequence was initiated, the requested status would be obtained, and a timer started to clear the requested status if not used within the timeout period. The program support, in the programmed control unit, for merely handling the test I/O command in this fashion was relatively extensive, and when the sequence was initiated it prevented the adapter from performing any other data or status transfers; the requirement for repeated identical commands reduced the efficiency of the channel, the procedure did not support stack status or asynchronous status requests, and the support provided for the test I/O command had very high program and I/O overhead.

It is therefore, one object of the present invention to provide a method and apparatus for improved I/O operations in connection with the use of channel equipment. It is another object of the present invention to provide such improved I/O operations, particularly with respect to the test I/O command in connection with a programmed control unit. It is still another object of the present invention to provide for such improved test I/O support with a programmed control unit which has relatively little impact on hardware count and complexity, but which greatly simplifies the programming and I/O overhead involved in supporting test I/O commands.

The manner in which the invention meets these and other objects, will become apparent as this description proceeds.

SUMMARY OF THE INVENTION

In accordance with the invention a channel adapter used in connection with a programmed control unit, is provided with a single additional hardware register which is used for the storage of status and address information for all the I/O devices associated with the programmed control unit. The improved channel adapter will, in response to a test I/O command, normally initially provide an adapter busy response, but an interrupt of the programmed control unit will be initiated to obtain the requested status. On completion of the interrupt processing, the status and associated address information will be loaded in the single hardware register, and control circuitry will be operated distinctively so as to indicate the presence of status available information. On a next subsequent test I/O command for the particular sub-channel (or address), the stored status information is presented to the channel, the register is cleared and the control circuitry is operated to a cleared condition.

Accordingly, the invention provides:

A method for storing and presenting status information relative to n sub-channel devices in which status information for the n sub-channels are stored in a random access memory, the access time of which is significant, comprising the steps of:

receiving a status request from a communication channel connected to a requesting device, responding immediately with a response which indicates that the information requested is not immediately available and that the requesting device is to independently present the request on the communication channel at a later time, transferring the requested status to a single status storage register, the access time of which is substantially shorter than access time of the memory, and providing the status stored in the single status storage register upon a subsequent request for status of the aforementioned sub-channel via said communication channel.

In another aspect the invention provides:

In a channel adapter for a programmed I/O device control unit for controlling a plurality of I/O devices, communication path means, including hardware registers, for passing data to/from said channel to/from selected I/O devices in cooperation with said control unit, a further hardware register of sufficient capacity to store a status word, and an associated address, bus means for transferring a status word and an associated address from said control unit, in response to a channel received command, to said further hardware register, and control means responsive to a subsequent status requesting command associated with said associated address, for placing said status word on said channel.

In accordance with this aspect of the invention, a further hardware register is provided, in addition to those hardware registers which may be used for passing data to/from said channel and the attached I/O devices, the further hardware register is of sufficient capacity to store a status word and an associated address for use in connection with test I/O (or TIO) commands. In response to a first test I/O command, the adapter in the programmed control unit returns a short busy response, and provides an interrupt to the programmed control unit, in order to fetch the requested status. The programmed control unit, thereafter in response to the interrupt, locates the desired status and loads the status word and the associated address into the further hardware register. Control circuitry recognizes this action and is operated distinctively to prepare the adapter for the next test I/O command related to that address. When the subsequent test I/O command is received from the channel, the distinctive condition of control circuitry, plus a comparison of the address associated with the status word, and the address associated with the test I/O command, on an equal comparison, results in placing the status word from the further hardware register on the channel.

Similar operation is effected, in accordance with this aspect of the invention, in the event that initiation of communication of the status word comes from the I/O device, rather than from the channel. In the event the channel does not accept this requested information, the information is "stacked", resulting in a so-called stacked status condition. The status word, and its associated address are placed in the further hardware register. In the event the channel issues a subsequent test I/O command related to that address, a similar operation is performed whereby the control circuitry recognizes the test I/O command in the simultaneous presence of a status available condition, compares the addresses, and on an equal comparison, places the status word on the channel.

It should be noted that prior art programmed control units were incapable of operating with asynchronous status transfers, i.e. those initiated by an I/O device, whereas the improved adapter of this invention quite readily handles this class of operation.

BRIEF DESCRIPTION OF THE DRAWINGS

The present invention will now be further described in the following portions of the specification when taken in conjunction with the attached drawings in which like reference characters identify identical apparatus and in which;

FIGS. 3-5 are schematics of the associated control circuitry in accordance with the present invention, incorporated in the improved adapter.

DESCRIPTION OF PREFERRED EMBODIMENTS

Figures 1, 2:
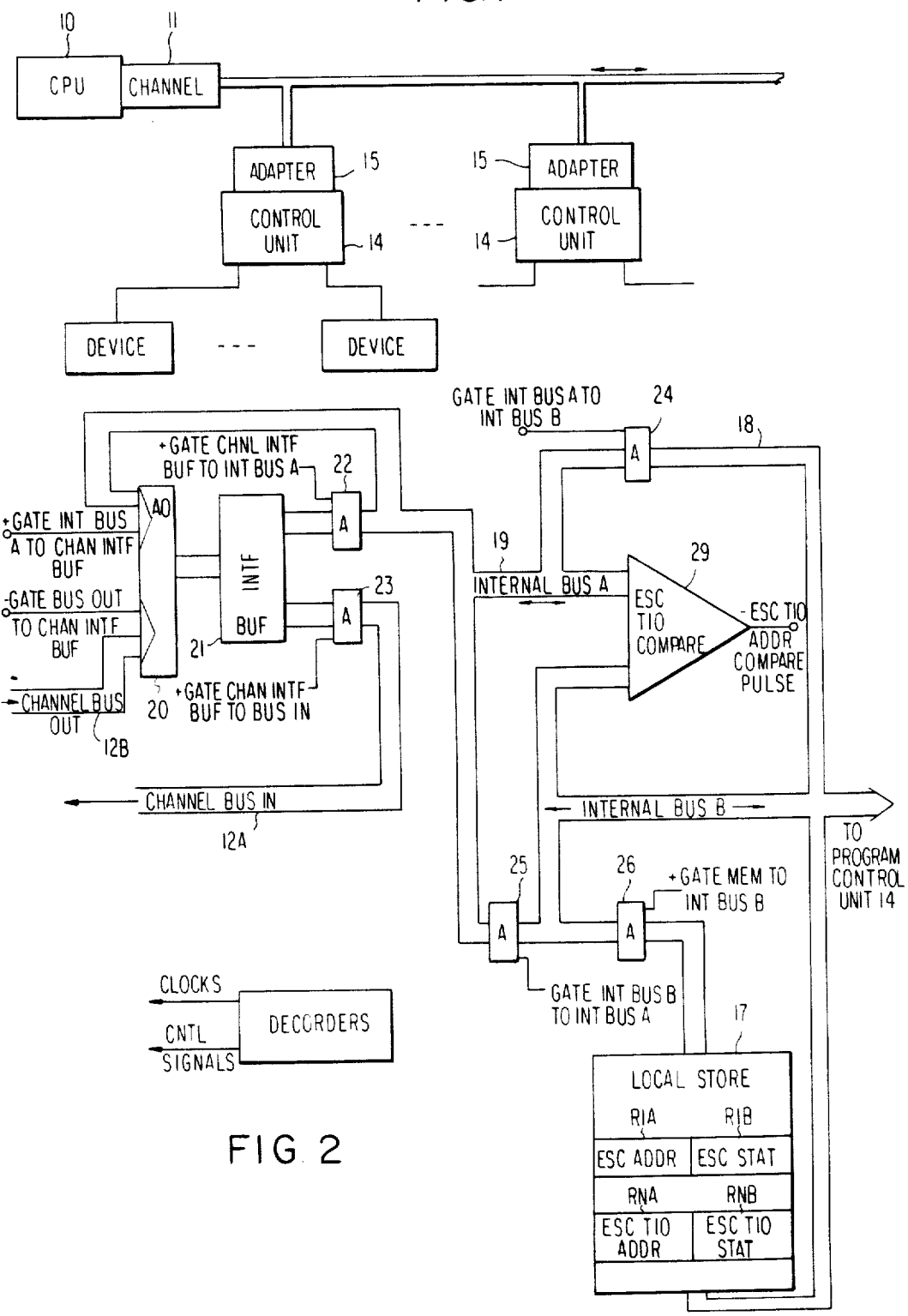
FIG. 1 is a block diagram illustrating the context in which the invention is applied.
FIG. 2 is a high level block diagram of the adapter with the present invention incorporated therein particularly illustrating the data flow.

Before describing the method and apparatus of the invention, reference is made to FIG. 1 to illustrate the manner in which the invention is applied. FIG. 1 illustrates a CPU 10 which is coupled to a channel 11. The channel 11 also connects to a bus 12 (supporting bidirectional data flow) which is connected to one or more programmed control units 14. Each programmed control unit 14 may in turn be connected to a plurality (for example, in one embodiment up to 255) of I/O devices. For purposes of identification, and subsequent description, each of these I/O devices is logically defined as a sub-channel, and thus, there is a one-to-one correspondence between sub-channels and particular I/O devices. In this regard reference is made to Bunker et al U.S. Pat. No. 3,680,054; Clark et al U.S. Pat. No. 3,725,864 and UK Patent No. 1,137,812, assigned to the assignee of this application for a more complete description of the connection between a CPU, Channel, and particular I/O devices.

The interface between the bus 12 and the programmed control unit 14, is the adapter 15, and it is an improved adapter which is the subject of this invention, as well as an improved method of transferring status information between the CPU 10 and a programmed control unit, via the adapter 15.

For a more detailed look at the adapter 15, reference is made to FIG. 2, which is a high level block diagram of portions of the adapter 15 relevant to the present invention. As shown in FIG. 2 the bus 12 connection to the adapter 15 actually comprises a Channel Bus In 12A and a Channel Bus Out 12B. The bus nomenclature is given with respect to the CPU and therefore, inputs to the adapter are designated Channel Bus Out, and outputs of the adapter are designated Channel Bus In.

The Channel Bus Out 12B is coupled to a demultiplexer or gating arrangement 20 which also receives, in connection with the Channel Bus Out 12B, a gating signal Channel Bus Out To Buffer. The gating arrangement 20 provides an output to an adapter interface buffer 21. The adapter interface buffer 21 provides outputs to AND gates 22 and 23, one output associated with a gating signal gate to bus A, and the other associated with a gating signal gate to Channel Bus In. The output of gate 23 is coupled to the Channel Bus In 12A, the output of gate 22 is coupled to internal bidirectional bus A, 19 which provides the other input to the gating arrangement 20, in conjunction with a gate Bus A to Buffer signal. The apparatus thus far explained enables information to be accepted from the channel bus, via Channel Bus Out 12B and coupled via gate 22, for example, to bus A. Alternatively, information from bus A can be coupled via the gating arrangement 20 to the interface buffer 21 and via gate 23 to the Channel Bus In 12A. Which path is employed depends, on the presence or absence of the appropriate gating signals.

The internal bus A is coupled to inputs of a further gate 24 and a comparator 29. An output of AND gate 25 provides another input to the internal bus A in the presence of the Gate Bus B To Bus A. Likewise, the referred to gate 24 can couple bus A, in the presence of Gate Bus A To Bus B, to a second internal bus B, 18. The same bidirectional internal bus B provides the input to AND gate 25. Bus B also provides the second input to the comparator 29 as well as to a local store 17. Bus B also provides an input to the programmed controlled portion of the control unit, as indicated in FIG. 2 at the right.

The local store 17 is comprised of a number of hardware registers used, for example, for the transfer of data to/from the channel and to/from the associated I/O devices.

However, in addition to those hardware registers provided in prior art adapters for programmed control units, local store 17 also includes registers RNA and RNB which are specifically designated to store subchannel status and associated address for response to test I/O commands. The single register RNA and RNB are used for all devices associated with the adapter in which the register exists. The local store 17 can be loaded from bus B and the particular register written (for example, RNA and RNB) is specified via address signals carried along the bus B. Store 17 has an output path to AND gate 26, which, when provided with the gate Store to Bus B, enables a selected word from the local store 17 to be placed on the internal bus B. The particular registers for the status word and associated address for response to test I/O commands are, in one embodiment of the invention, loaded in connection with the X '6B' command as will be explained hereinafter.

In addition to the foregoing apparatus, the adapter 15 also includes hardware for generation of certain control signals and clocks based on the presence of selected signal or signal combinations sensed on the channel 12. This apparatus is shown functionally in FIG. 2 as hardware decoders for selected signals or signal combinations.

Figure 3:
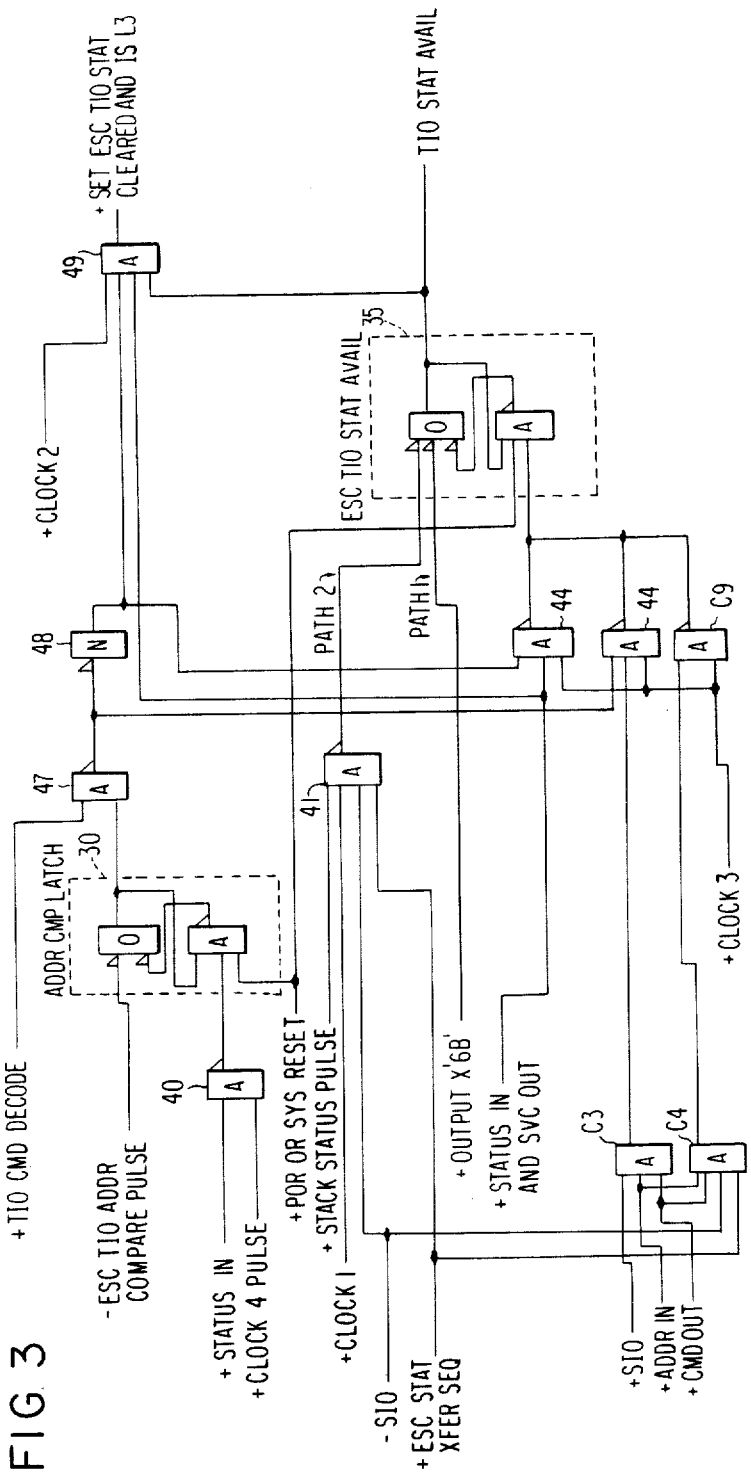

FIG. 3 is a schematic of the control circuitry used in connection with the method and apparatus of the invention. More specifically, the control circuitry shown in FIG. 3 includes a pair of latches, first an address compare latch 30, and second an emulator subchannel test I/O status available latch (ESC TIO STAT AVAIL) 35. The output of latch 35 is used with other portions of the adapter hardware in responding to a second or subsequent test I/O command to the associated address. The address compare latch 30 is set, if the comparator 29 indicates an equal comparison. The output of the address compare latch 30 is used by other adapter hardware to develop gating signals at the appropriate time to gate the contents of the register RNA through the bus B, bus A connection to the interface buffer and from there to the Channel Bus In, as will be explained.

The other control and clocking signals input to the logic FIG. 3 will be described in connection with the description of the operation, at this point, it is sufficient to note that these control and clocking signals are generated by adapter hardware in response to particular signals or signal sequences detected on the Channel Bus Out 12B.

The latch 35, if in a reset condition, can be set either via the gate 41, or the command to load RNA, RNB, which in one embodiment is the signal X '6B'.

In normal operation, communication between the host CPU 10, and any control unit, and associated adapter, is carried out via a particular sequence; this sequence begins with the host CPU 10 placing an emulator sub-channel (hereinafter ESC) address on the Channel Bus Out 12B. This address will be examined by each attached adapter 15, to determine whether or not it corresponds to the ESC address of any attached device. At the adapter which is associated with the ESC addressed device, this comparison will result in the adapter returning to the host a signal indicating that the address has been received and recognized. The host thereafter, in response to that acknowledgement, may place a command on the Channel Bus Out, which will be accepted at the adapter 15 which had previously recognized the address. At this point, the interface buffer 21 will contain the ESC address and command. In general the adapter 15 responds with an initial status indicating the command has been appropriately received. In a majority of cases the commands are substantially responded to by the programmed portion of the control unit, and thus the adapter hardware merely gates the command and address through bus A, and bus B (via gates 22 and 24) to the program control unit for appropriate response. The response of the adapter 15 to a test I/O command is somewhat different in that the command itself is decoded in the adapter hardware, and assuming that the latch 35 is reset, two effects are produced. Firstly, the hardware places an initial status on the Channel Bus In, to indicate a temporary busy condition to the host. At the same time, the adapter causes an interrupt to the programmed control unit. The programmed control unit is arranged to recognize the command and ESC address and fetch the desired status word. The operation of obtaining the status information by the programmed control unit requires access to a random access memory which in turn requires first obtaining the address at which the information can be found. Since this operation takes an appreciable amount of time (as compared to simply reading a hardware register) it is not considered wise to hold up channel operation during this access. Accordingly, the busy response allows the CPU or channel to proceed with other operations while the memory access occurs. When the programmed control unit has accessed the required status information it then executes an output function to load the ESC address and associated status in the registers RNA and RNB, of local store 17. This is accompanied by an appropriate address (gating) signal to local store 17 and may for example be the X '6B' gating signal discussed above. The same gating signal, as shown in FIG. 3, may cause the latch 35 to be set. It should be noted here that during the time of interrupt processing the channel or host may send multiple TIO commands to the same address. Each results in a short busy response from the adapter until the status available latch is out. If, after the latch 35 is set, the host 10 is in a TIO loop, ESC status will be cleared via the ESC TIO status path, and if not in a TIO loop, any pending status will be cleared with a normal path, particularly a control unit initiated status transfer sequence. A transfer of the status and ESC address to the adapter completes the programmed control units response to the command and then, the program resets the interrupt. At this point, the programmed control unit is in the same condition as it was prior to the TIO command except that the status and address are located in the register's RNA, RNB in local store 17, and the status available latch 35 has been set. Because of the presence of registers RNA, RNB the programmed control unit, in contrast to the prior art programmed control units, can carry on data transfers for other devices (on other sub-channel addresses) without disturbing the stored status and address or the condition of the status available latch.

In this condition the adapter is conditioned to provide the particular status for the associated address, in response to a test TIO command. The manner in which this is effected is now explained.

Once the status available latch is set, any subsequent start I/O (SIO) sequence will begin with an address placed on the Channel Bus Out; and as explained above the address will be gated into the interface buffer 21. With the status available latch set, any SIO sequence will cause the associated address to be read from a local store 17 and gated to the comparator 29 (via gate 26). The address in the interface buffer is likewise gated to comparator 29 through the gate 22. If the addresses compare, the comparator 29 produces an output (- ESC TIO address compare pulse) which is arranged to set the address comparator latch 30 (in FIG. 3).

In any SIO sequence the host CPU then places the command on the Channel Bus Out, and this command is gated to the interface buffer in the adapter which recognized the previous address. If the adapter 15 recognizes the TIO command, the condition of the address comparator latch 30 (set) results in the status, from local store 17 being read out, gated through gate 26,25. gating arrangement 20 to the interface buffer 21. This status if further gated through the gate 23 onto the Channel Bus In 12A.

When the status is presented to the host, the address compare latch 30 is reset via gate 40, see FIG. 3. If the status is accepted by the host, the adapter 15 initiates a further interrupt, and the output of gate 49 sets a status cleared latch (not shown) to indicate that the status was cleared by a TIO command. The same conditions also results in clearing the status available latch 35 via gate 44. In this regard, note that with the address compare latch set, the adapters recognition of a TIO command results in enabling gate 47 which, via inverter 48 partially enables gate 44 and 49. When the host accepts the status a second input to gate 44 is present, and at the appropriate time (of clock 3) the status available latch is reset. However, prior to that time, (namely, at clock 2 time) gate 49 becomes fully enabled to set the status cleared latch and request a further interrupt to the programmed control unit.

The preceding description relates to the set-up and use of the TIO address and status registers RNA and RNB of the local store 17 in response to a first TIO command which receives a busy response, and then a subsequent TIO command which receives the status response. However, the same apparatus can be set up and used with but a single TIO command, as will now be explained.

Under certain circumstances, a programmed control unit by itself may initiate an attempt to transfer status to the host CPU 10, for example, at the completion of a read or write operation. If this transfer is successful, the particular logic circuit of FIG. 3 does not come into play. However, if the host CPU 10 does not accept the status transfer, the host may enter a condition which will generate a stack status sequence. This sequence may have the effect of setting the status available latch 35. Note that prior art adapters are incapable of handling such 'stacked' status.

In more detail, when a control unit status transfer sequence is initiated, the control unit will raise the line "Request-In" on the Channel Bus In at the host. The host will then poll the interface, i.e., activate Select Out and Holdout. On receipt of Select Out, the channel adapter will logically connect to the host and place the associated address from the local store into the channel interface buffer via gates 26, 25, 20. From the buffer, the address is gated through gate 23 to the Channel Bus In. At the same time, the same address is placed in the TIO address register, RNA, through gate 24. Following this operation the associated status, from local store 17, is placed into the channel interface buffer through the same gates, and then presented to the host on the Channel Bus In. If the host does not accept the status, then the stack status sequence is produced which enables the status available latch 35 to be set. At the same time, the associated status byte is routed via gates 22, 24 to the TIO status byte register, RNB.

With the status available latch set, a subsequent TIO command to the particular ESC address will result in transfer of the status to the Channel Bus In, in a manner already explained.

FIG. 4 is a detailed schematic of the adapter 15 logic used to transfer ESC address from local store 17 to comparator 29 in the event the status available latch is set and a SIO command is received. AND gate 101 is subjected to inputs identifying SIO, COMMAND or SVC OUT and TIO STAT AVAIL, the latter is the output of latch 35. In the presence of these inputs, and timed via the timing signal input, gate 101 produces an output READ TIO ADDRESS. This signal, coupled through OR gate 102, is one input to an encoder 103. Another input is gate ESC TIO status, the use of which will be explained in connection with FIG. 5. In the presence of READ TIO ADDRESS, encoder 103 outputs a signal to addressing unit 104 to load LSAR (local store address register) 105 with the address of RNA. This address is coupled over LSAD bus 106 to the store 17 wherein it is used to select and read out RNA. The data read from RNA is gated, via gate 26 (see FIG. 2) to provide one input to comparator 29. As already explained, the other input to comparator 29 is the selected address from buffer 21, gated via gate 22 and bus A to comparator 29. In the event the addresses are equal, the comparator output sets address compare latch (see FIG. 3). The effect of the signal is shown more explicitly in FIG. 5.

FIG. 5 shows that portion of the logic of adapter 15 which effects the reading of the status byte from local store 17 to the Channel Bus In 12A. More particularly, the output of address compare latch 30, latch 35, SIO and COMMAND OUT and ADDRESS IN is provided to AND gate 107. In the presence of these signals, and timed by the timing input, gate 107 outputs a pulse to OR gate 108. The output of OR gate 108 is the gate ESC TIO status input to encoder 103. On receipt of this signal encoder 103 changes its output so that LSAR 105 and bus 106 address RNB rather than RNA. In this fashion the status byte (from RNB) is gated through gates 26, 25, assembler 20, where it is available to buffer 21. From buffer 21, the information is transferred via Channel In Bus 12A to the host CPU.

What is claimed is:

1. A method for storing and presenting status information relative to a plurality of sub-channel devices in which the status information for each sub-channel is stored in a random access memory means, the total access time of which is a substantial significant time factor in response to a request for the status of one said plurality of sub-channel devices comprising the steps of:

receiving a first status request for a particular device corresponding to a particular sub-channel from a communication channel connected to a requesting device, responding immediately with a response that indicates that the information requested is not immediately available and that the requesting device is to independently present the said first status request on said communication channel at a subsequent time, accessing the random access memory means location which contains the requested status information and transferring the said requested status to a single status storage register which serves all of said sub-channel devices, the access time of which is substantially shorter than the random access memory means, and providing the status stored in the said single status storage register upon the receipt of the said subsequent status request for the status of the aforementioned sub-channel via the said communication channel.

2. The method of claim 1 which includes the further steps of:

storing, along with said status information, information respecting a sub-channel address.

3. The method of claim 1 in which said last step includes the further steps of:

controlling an indicator to a distinctive condition to indicate the presence of said status information in said register, subsequently comparing an address associated with a TIO command with said stored sub-channel address if said indicator is in said distinctive condition, and supplying said stored status information to said channel in the event said associated address and said sub-channel address are identical.

4. The method of claim 3 which includes the further step of:

controlling said indicator to another condition if said supplying step is performed.

5. A method of transferring status information, asynchronously from a multi-sub-channel I/O control unit to a host via a channel comprising the steps of:

accessing the status information attempting to transfer status information for a particular sub-channel via said channel to said host upon receiving a TIO command from said host for said status information, stacking said status information by storing the status information and the associated sub-channel address in a dedicated register in response to a refusal by said host to accept said status information, and subsequently transferring said status information from said dedicated register to said host via said channel in response to a subsequently received TIO command having an associated address which is identical to the stored associated sub-channel address in the dedicated register issued from said host system.

6. The method of claim 5 in which said last named step comprises the steps of:

comparing the sub-channel address associated with said subsequent TIO command to said associated sub-channel address stored in the register, and initiating said transferring of said status information in the event said addresses are identical.

7. In an channel adapter for interconnecting a channel and a I/O device control unit for controlling a plurality of I/O devices, said control unit including a random access memory means which includes at least one unique address for storing the status word for each I/O device and an associated device address,
communication path means in said adapter for passing data to/from said channel and to/from said selected I/O devices via said control unit,
a single hardware register located in said adapter of sufficient capacity to store a status word, and an associated device address,
means for accessing and transferring a status word and an associated device address from said control unit random access memory means, in response to a received first status request command from said channel, to said single hardware register,
and control means in said adapter responsive to a subsequently received first status request command associated with an associated address which is identical to the stored associated device address in the hardware register, for transmitting said status word stored in said single hardware register onto said channel.

8. The apparatus of claim 7 in which said control means includes:
a first device set to a first condition on the transfer, from said control unit to said single hardware register, of said status word and associated address,
comparator means,
means coupling an address associated with a subsequently received first command to one input to said comparator means and for coupling said associated addresses to another input in response to receipt of the subsequently received command when the said first device is in said first condition, and
means for transmitting the said status information from said single hardware register to said channel upon an output of said comparator means indicating a fixed relation between said addresses.

9. The apparatus of claim 8 in which said last named means further includes means to reset said first device.

10. The apparatus of claim 8 in which said fixed relation is equality.

* * * * *